United States Patent
Cowans et al.

(10) Patent No.: US 6,209,334 B1
(45) Date of Patent: Apr. 3, 2001

(54) SYSTEMS AND METHODS FOR CAPACITY REGULATION OF REFRIGERATION SYSTEMS

(75) Inventors: Kenneth W. Cowans, Fullerton; Glenn Zubillaga, Coulton, both of CA (US)

(73) Assignee: B/E Aerospace, Anaheim, CA (US)

( * ) Notice: Subject to any disclaimer, the term of this patent is extended or adjusted under 35 U.S.C. 154(b) by 0 days.

(21) Appl. No.: 09/618,292

(22) Filed: Jul. 18, 2000

Related U.S. Application Data

(60) Division of application No. 09/060,655, filed on Apr. 15, 1998, now Pat. No. 6,109,047, which is a continuation-in-part of application No. 08/931,135, filed on Sep. 16, 1997, now Pat. No. 6,102,113.

(51) Int. Cl.[7] .............................. F25B 41/00; F25B 41/04
(52) U.S. Cl. .................................................. 62/224; 62/513
(58) Field of Search .............................. 62/224, 513, 524, 62/498

(56) References Cited

U.S. PATENT DOCUMENTS

| | | |
|---|---|---|
| 2,272,099 | 2/1942 | Smith . |
| 2,319,005 | 5/1943 | Lum . |
| 2,534,455 | 12/1950 | Koontz . |
| 2,577,903 | 12/1951 | McGrath . |
| 3,478,534 | 11/1969 | Matthies . |
| 4,171,087 | 10/1979 | Kunz . |
| 4,461,635 | 7/1984 | Rudebeck . |
| 4,475,686 | 10/1984 | Huelle et al. . |
| 4,632,358 | 12/1986 | Orth et al. . |
| 4,745,767 | 5/1988 | Ohya et al. . |
| 4,794,762 | 1/1989 | Orth et al. . |
| 4,811,568 | * 3/1989 | Horan et al. ........................ 62/513 X |
| 4,835,976 | 6/1989 | Torrence . |
| 4,841,734 | 6/1989 | Torrence . |
| 4,879,879 | 11/1989 | Marsala et al. . |
| 4,984,735 | 1/1991 | Glennon et al. . |
| 4,995,240 | 2/1991 | Barthel et al. . |
| 5,148,978 | 9/1992 | Stapelbroek . |
| 5,187,944 | 2/1993 | Jarosch . |
| 5,195,331 | 3/1993 | Zimmern et al. . |
| 5,201,190 | * 4/1993 | Nelson et al. ........................ 62/511 |
| 5,515,695 | 5/1996 | Sakakibara et al. . |
| 5,546,757 | 8/1996 | Whipple, III . |
| 6,102,113 | * 8/2000 | Cowans ................... 165/206 |
| 6,109,047 | * 8/2000 | Cowans et al. ................... 62/199 |

FOREIGN PATENT DOCUMENTS

| | | |
|---|---|---|
| 1 055 018 | 4/1959 | (DE) . |
| 3405313 A1 | 8/1985 | (DE) . |
| 8300819 | 10/1984 | (NL) . |

\* cited by examiner

*Primary Examiner*—William Wayner
(74) *Attorney, Agent, or Firm*—Jones, Tullar & Cooper PC; Raymond A. Bogucki

(57) ABSTRACT

An arrangement is provided for insuring that excessive demand is not placed on a refrigeration unit that supplies pressurized subcooled refrigerant to different channels having independent needs for use of refrigeration capacity. A separate reference channel receives a portion of the refrigerant and expands the refrigerant fully to a gas phase to establish a minimum level reference temperature. In the operative channels the refrigerant flows into individual evaporators/heat exchangers at rates set by external command signals, the refrigerant being in heat exchange relation with thermal transfer fluid in the evaporator/heat exchanger. Evaporation of refrigerant in each channel thus brings the thermal transfer fluid for that channel to the target temperature. By comparing the post evaporation temperature in each channel to the reference temperature and reducing the refrigerant flow rate whenever the difference is below a threshold, individual channels are not overtaxed and the system remains stable.

3 Claims, 5 Drawing Sheets

SYSTEMS AND METHODS FOR CAPACITY REGULATION OF REFRIGERATION SYSTEMS

REFERENCE TO RELATED APPLICATIONS

This application division of 09/060,655, filed Apr. 15, 1998 now U.S. Pat. No. 6,109,047 which is a continuation-in-part of Ser. No. 08/931,135, filed Sep. 16, 1997 now U.S. Pat. No. 6,102,113 and entitled Temperature Control of Individual Tools in a Cluster Tool System, inventor Kenneth W. Cowans and assigned to the Assignee of the present invention.

BACKGROUND OF THE INVENTION

This invention relates to systems and methods for ensuring that a single refrigeration unit supplying refrigerant for a number of individual control channels is not overtaxed by the demands of one or more of the channels.

In a number of situations in which controllable refrigeration capacity is needed, it is advantageous to utilize a single refrigeration unit for providing pressurized refrigerant to two or more control channels, each of which is separately regulated to maintain the temperature of an existing fluid circuit or device. An example is found in the above referenced prior filed application, which is particularly described in terms of an example for controlling the temperature of a number of different tools in a cluster tool system for fabricating semiconductors. In this context, minimal floor space and high reliability are of paramount importance, so that a compact physical configuration, long term operation, and precise and stable temperature control are significant operative goals. The system described and claimed in the referenced application achieves these objectives by utilizing a single large refrigeration unit having adequate nominal capacity for total demand and providing pressurized liquid refrigerant into separate control channels, each including a control loop for adjusting the temperature of heat transfer fluid circulated through the associated tool. The flow rate of the refrigerant in each channel is separately controlled in accordance with the target temperature needed at the tool at particular point in time. In each channel, the refrigerant is fed at its chosen rate, and in a two phase state, into an evaporator/heat exchanger thus being at the evaporation temperature. In the heat exchanger heat of evaporation is given up in cooling a thermal transfer fluid also passing through the evaporator/heat exchanger at a constant rate. This occurs independently for each of the channels, which can have different refrigeration demands at any particular time. For example, a maximum demand can be imposed in one channel which is required to drop the tool temperature as rapidly as possible, as to effect a process changeover, while one or more other channels are, temporarily at least, in a relatively stable mode.

In this system, the temperature level that is to be regulated is that of the semiconductor fabrication tool, which is outside the closed refrigeration loop. Thus the superheat (the difference between refrigerant temperature before and after heat exchange) cannot be used for control and limiting of demand.

Under these circumstances, an unstable condition can arise when any channel or the refrigeration unit itself is temporarily overtaxed, since the flow rate to each evaporator is servoed to the target temperature of the remote tool. The instability arises when the return refrigerant is not entirely in the gas phase, so that liquid is present in the refrigerant returned to the compressor from one or more channels. In consequence, a well known but complex reaction can occur within the refrigeration system in which the compressor drops in efficiency (and can be damaged). When this "flooding" occurs, the greater the demand for cooling capacity the lower will be the performance (the opposite of what is wanted) and, as flow is increased the more liquid will be returned, increasing the likelihood of damage to the compressor system. It is not feasible in this type of system to place arbitrary limits on the refrigeration capacity of each channel, because this would unduly extend the costly process times involved in semiconductor fabrication, even though adequate refrigeration capacity may be available for each channel.

Although conventional proportional flow valves, including temperature responsive control valves using bimetallic elements, can be utilized in the separate channels, it is preferred, primarily because of higher reliability, but also for reasons of linearity, resolution and freedom from hysteresis to employ thermal expansion valves which are responsive to the pressure in a closed gas circuit. These closed circuits include a bulb containing a pressurized gas that is positioned proximate a temperature source at a given temperature level, such as a chilled refrigerant conduit. A tube from the bulb communicates with a volume, within the valve, that is bounded by a flexible diaphragm, which then flexes in response to the gas pressure. The diaphragm in turn controls the position of a valve element which occludes a flow orifice to a selected degree. The internal pressure within the bulb and the closed pressure circuit can be changed by command signals applied to a heater in thermal interchange relation with the bulb, and regulated by a command servo circuit As described in a previously filed application of Richard Petrulio, et al. Expansion Valve Unit, Ser. No. 08/953,101, filed Oct. 17, 1997, assigned to the assignee of the present invention, this system can incorporate a thermal insulation between the heater and the bulb in order to integrate temperature fluctuations. It can be used so as to control refrigerant flow in response to a remotely detected temperature (i.e. a tool, controlled unit, or refrigerated compartment).

Whether referred to as regulation of capacity or avoidance of flooding of the compressor, the system must avoid initiating the astable condition, while at the same time it must be able to utilize the available refrigeration capacity in the most efficient manner for each of the two or more independently operable channels that may be used in the system. Since the control temperatures and the refrigeration demands in individual channels vary independently and since total refrigeration rate also changes, these objectives present unique problems if overtaxing the refrigeration unit is to be avoided.

SUMMARY OF THE INVENTION

These and other objectives of the invention are met by a system utilizing a temperature reference that is responsive to refrigeration unit output to compensate flow rate control signals before an astable condition arises in any channel. The system imposes very low demand on refrigeration capacity, and enables each control channel to utilize available refrigeration capacity to the fullest extent consistent with proper operation of that channel. To these ends, a small reference evaporator is disposed in parallel with parallel evaporator/heat exchanger combinations in each of two or more channels. The reference evaporator is supplied refrigerant through a constant expansion device, such as a capillary, to establish a low reference temperature at the evaporator that varies only with the available refrigeration unit output. The thermal expansion control valves in each of the channels are made responsive to this reference temperature as well as command signals provided to heaters associated with each sensor bulb. Each of the heaters is driven by its command signal to a selectable temperature determined by the servo circuits in the controller so as to balance the valve setting at the needed position for flow control. In addition, the boil off rate at each separate evaporator is indirectly measured by determining the difference between each evaporator output temperature and the reference evaporator output. In one example, a multi-channel controller monitors the temperature differences to insure that a certain minimum differential is maintained, assuring adequate boil off to avoid the return of liquid to the refrigeration unit. When the temperature differential reduces to or below a threshold level, the controller reduces the heater control signal for that channel, thus reducing the orifice size and the amount of refrigeration capacity used in that channel.

If, for example, an initial temperature correction signal represents a transitional cooldown phase, the valve can be opened substantially fully, with the expectation that there will be adequate initial evaporation. The servo command is however subordinated to the compensator, which reduces the flow rate and the demand for refrigeration capacity if the channel might approach a flooding condition. This allows other channels to continue to operate normally and precisely unless they themselves approach the astable condition.

Other features in accordance with the invention aid in achieving these objectives. For example, the thermal path between an evaporator output and a temperature sensor is arranged such that the presence of a liquid in the output is sensitively detected, with minimal influence from external thermal sources. The thermal expansion valves and the associated heaters, which can be subjected to substantial temperature extremes, are protected against damage by safety circuits responsive to detected temperatures which prevent operation under excessive initial temperature differentials. Overtaxing of the refrigeration unit is also avoided by using the reference evaporator temperature as an operative reference to insure that output pressure from the refrigerant unit does not become excessive if return flows become overly heated. The electronic portion of the system in this example is such that individual settable controllers for each channel can be used to choose particular temperature differentials. These channels can be part of an economic and reliable multichannel controller system that is separate from the servo control system which programs and monitors temperature.

In a different multi-channel system in accordance with the invention, the system uses a single servo controller setting target temperatures for each channel, and compares the temperature output from a reference evaporator to the temperature outputs from each evaporator, in a comparator circuit. The delta values from the comparator are used to subtract from command signals from the controller whenever the temperature differentials are inadequate. This is done in separate subtraction circuits receiving the different command signals. The difference signals are utilized to control the openings of different proportional flow control valves which are directly signal responsive and supply-the evaporator/heat exchangers in the channels.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
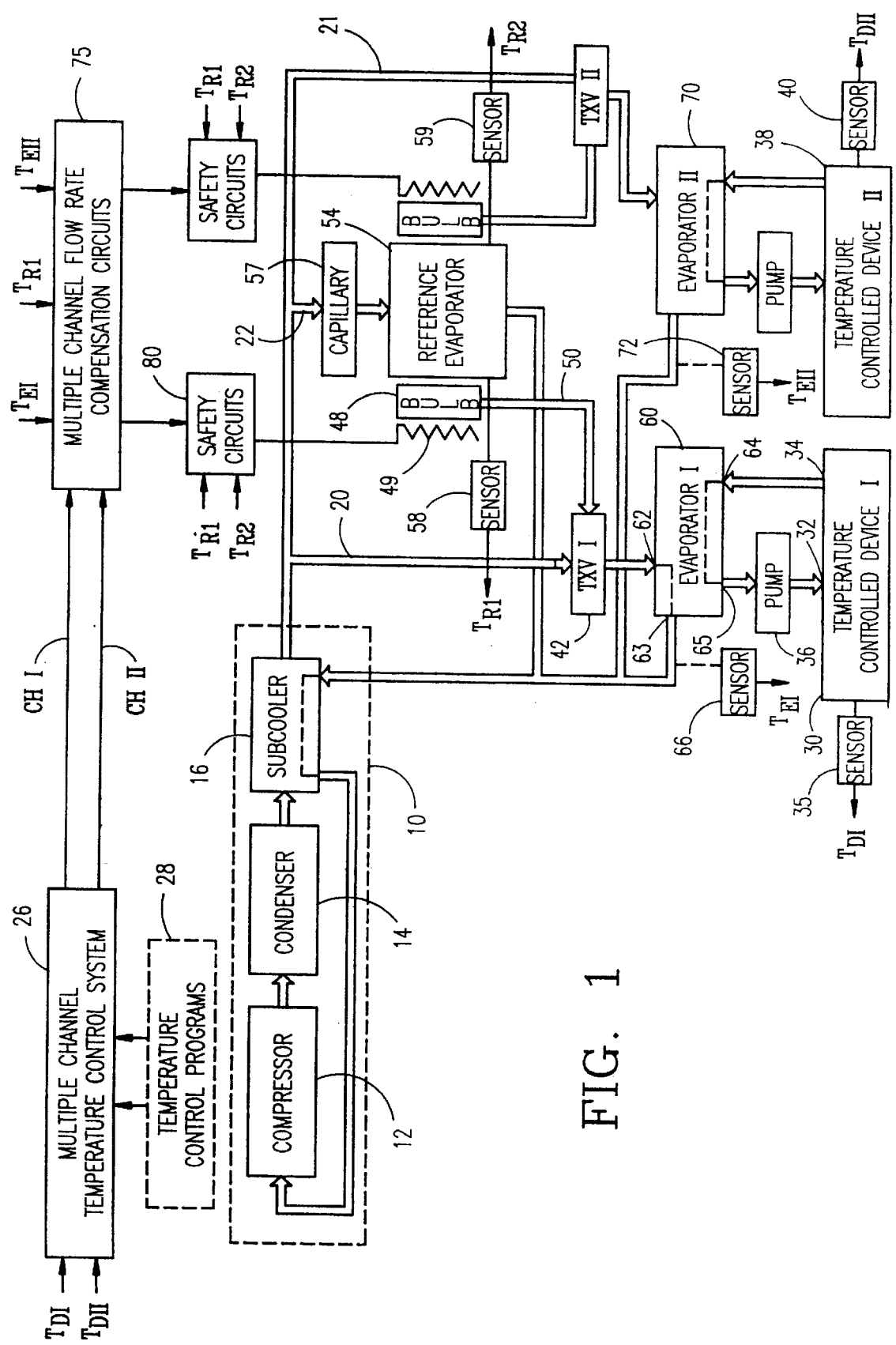
FIG. 1 is a block diagram of a system for capacity regulation in accordance with the invention.
Figure 2:
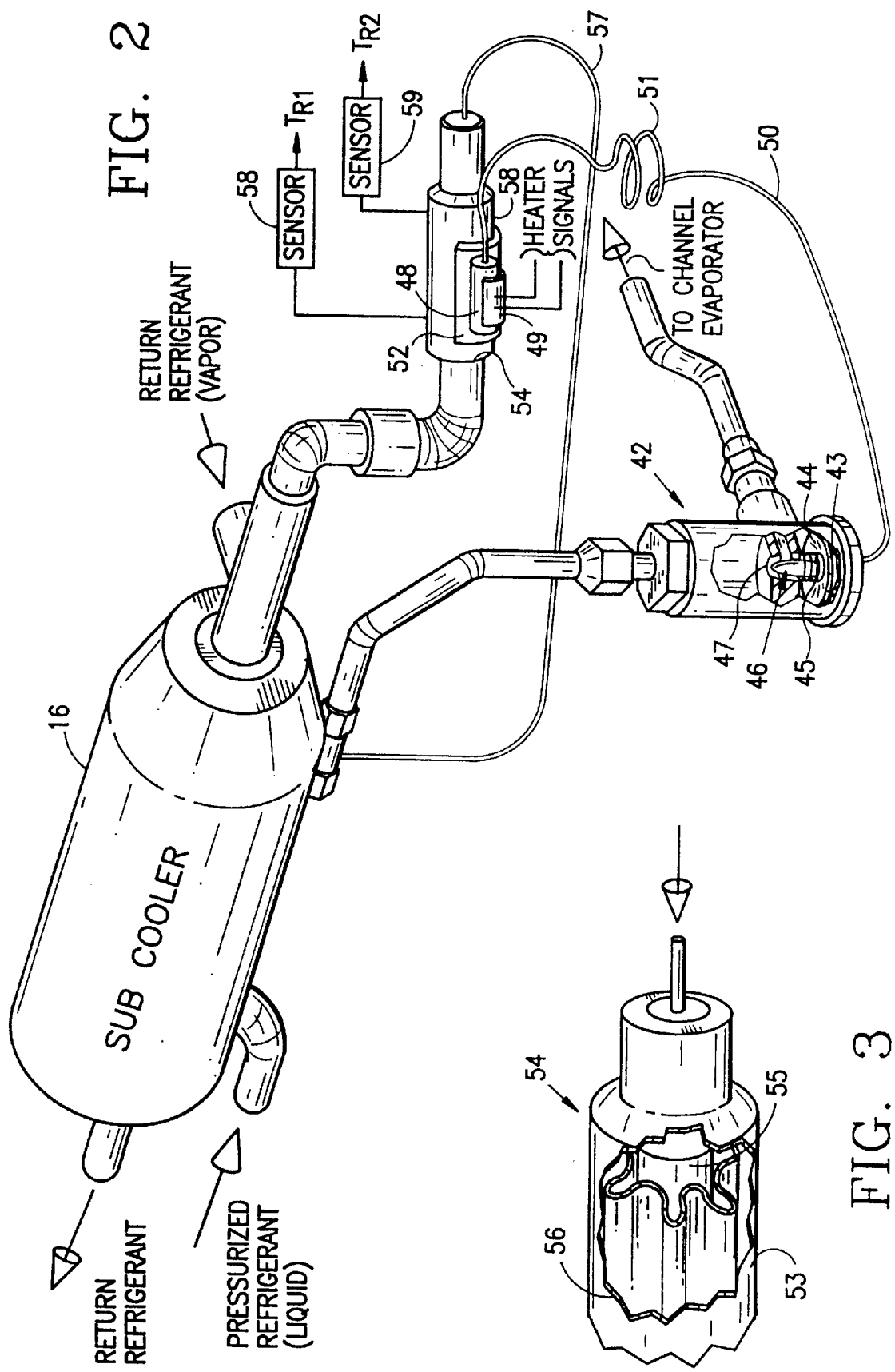
FIG. 2 is a perspective view, partially broken away, of a reference evaporator and pressure-variable closed bulbs utilized in the system of FIG. 1.
Figure 3:
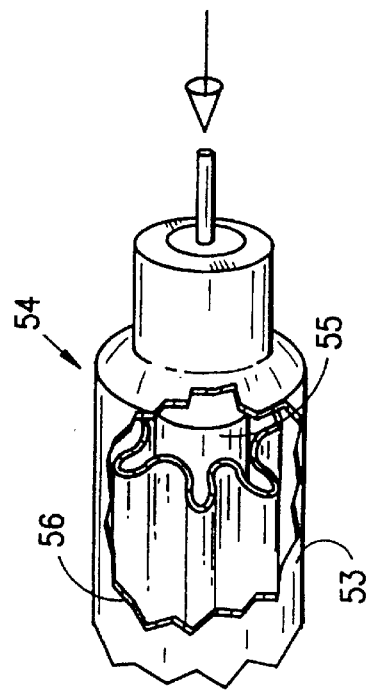
FIG. 3 is a perspective view, partially broken away, showing internal details of the reference evaporator of FIG. 2.

A refrigeration system in accordance with the invention, referring now to FIGS. 1–3, includes a refrigeration unit 10 having adequate refrigeration capacity, in this instance of the order of 5–10 hp, to meet the expected demand of two or more cooling channels. The unit 10 provides pressurized refrigerant at high pressure (e.g. 200 psi) but at ambient or substantially ambient temperature. Although the refrigeration unit 10 may be a single stage or a two stage unit it is depicted as a single stage unit shown (only generally) as having a compressor 12, a condenser 14 and a subcooler 16. The subcooler 16 is deployed in the return refrigerant path, so as to provide further chilling of refrigerant outflow with the gas phase return flow, thus increasing system efficiency. Other features which may be employed in modern high efficiency refrigeration units 10, such as bypass circuits, temperature and pressure safety switches, filters, and gas and oil separators may be used, but are not shown for simplicity inasmuch as they are optional features and not required for the claimed invention.

Pressurized refrigerant flow from the refrigeration unit 10 is divided into more than one separate control channel for independent cooling of different operative units, such as semiconductor fabrication tools, with return flows from the channels being fed back into the refrigeration unit 10 at the subcooler 16. Here a first control channel 20 and a second control channel 21 branch off from the refrigeration unit 10, while a third branch comprises a reference channel 22 used for needed system stabilization. The usage of available refrigeration capacity supplied to the different control channels, 20, 21 is governed by a temperature control system 26, providing servo command signals for refrigerant flow modulation in each of the control channels 20, 21. The time-temperature profiles desired for the tools or other units that are controlled by the different channels are established in conventions fashion by program control software 28 operating the temperature control system 26. Assuming the control units being operated are tools employed in a complex process (e.g semiconductor fabrication), only one operation, namely control of the temperature of temperature controlled device I (tool 30) need first be briefly described by way of example. The thermal transfer fluid, which is usually a water/glycol or proprietay commercial mixture, passes through the tool 30 between an inlet port 32 and an outlet port 34 via internal passageways (not shown) in the tool that are distributed so as to maintain the tool 30 temperature substantially at the then existing temperature of the thermal transfer fluid. The tool 30 temperature is monitored by a temperature sensor 35 which is coupled as an input ($T_{DI}$) to the temperature control system 26. For the first temperature controlled device or tool 30, a pump 36 for the channel maintains he thermal transfer fluid pressurized and circulating at a substantially constant rate. A second tool 38 is in a separate circulating loop which includes its own pump and inlets and outlets at the tool 38, as previously described, together with a separate temperature sensor 40 for indicating the actual operating temperature of the second tool 38 and providing a signal ($T_{DII}$) to the temperature control system 26.

The controls for the refrigerant flowing in each control channel 20 and 21 are similarly arranged, so that the controls in only one channel, e.g. the first channel 20, are to be described in detail. This arrangement is better understood by concurrent additional reference to the fragmentary view of FIG. 2, wherein the flow control arrangement in the first channel includes a thermal expansion valve device 42. This is the type of thermal expansion valve having a pressure chamber 4 bounded by an internal flexible diaphragm 44, the degree of flexure of which against a spring 45 determines the extent to which a valve needle or other control element 46 occludes an orifice 47 in the pressurized refrigerant conduit. The pressure chamber 43, adjacent one side of the flexible diaphragm 44, is in gaseous intercommunication with a pressure bulb 48 positioned remotely to sense the temperature of a different source, namely the surface of a reference evaporator 54 used as a reference. The intercommunication is via a conduit 50 which may have a number of turns 51 so as to facilitate manual adjustment. The pressure bulb 48 is filled with a pressurized gas and is a substantially closed element except for the connection to the valve 42, so that the conjunction of heat from the reference evaporator 54 determines the interior pressure in the bulb 48. Variation in heat conduction are averaged or integrated with time by an intervening insulation layer 52 between the bulb and the associated thermal source 54. The internal bulb 48 temperature will be varied, however, by an external heater 49 which receives an applied control signal, and which is also disposed in thermal communication with the bulb 48. Consequently, the two thermal inputs to the bulb 48, namely the conductive heat transfer input from the associated chilled source 54 and the resistive heat input responsive to the control signal, establish a temperature balance which determines the pressure in the bulb 48 and thus in the pressure chamber 43 of the valve 42.

The reference evaporator 54 subsystem, with specific reference to FIGS. 2 and 3, is a configuration which assures maximum cooling effect a its exterior surface, in order to establish a measurable temperature reference that is substantially unaffected by heat losses. A cylindrical outer wall 53 defines an accessible interior volume having its central region filled by an axial rod 55 and its outer radial region occupied by a cylindrical finned structure 56 in conductive contact with the wall 53. The heat conductive fins are sinuous along a circumferential pattern and straight lengthwise along the central axis, the whole providing a heat sink that is chilled uniformly and efficiently by constantly flowing expanded refrigerant, thus maintaining a substantially constant temperature at the wall 53 during operation. Two temperature sensors 58, 59 are thermally coupled to the wall 53, to provide reference temperature signals. Although, dependent on the sensor system, only one need be used in some installations, this example preferably employs two thermocouples as the sensors. Because the well known thermocouple has two terminals and provides a voltage representative of the difference in temperature between the terminals, this feature is used in making a temperature comparison or $\Delta T$ measurement using a first sensor 58, as described below. The other sensor 59 is used to provide a signal representing the absolute value of the reference evaporator 54 temperature. The signals are designated $T_{R1}$ and $T_{R2}$ respectively.

Pressurized refrigerant flowing in the reference channel 22 via a small capillary 57 is expanded to completely gas phase within the reference evaporator 54, which drops the gas phase refrigerant temperature to a minimum level, dependent upon the pressure and temperature of the refrigerant at the outlet of the refrigeration unit 10, but typically in the range of 44° C. The insulative layer 52 introduces a small delay in thermal response, thus aiding in stabilizing the circuit against short term variations. The reference evaporator 54 is volumetrically small, and requires only a very minor portion of the refrigerant flow to fulfill its function. The reference evaporator 54 output is part of the return flow into the subcooler 16, which also receives return flow from the other channels 20, 21.

Each control channel 20, 21 also includes a channel evaporator 60 or 70, further details of one of which are shown in FIG. 3, to which reference is also made. Each evaporator 60 or 70 (only one of which is described) internally comprises a set of heat conductive evaporator plates, separated by spaces which alternately confine refrigerant and thermal transfer fluid. Heat energy is transferred between the opposite sides, through each internal plate, with the heat of vaporization being the primary thermal effect used in chilling the heat transfer fluid. Along one side of the evaporator 60, refrigerant input and output ports 62, 63 respectively are coupled to the appropriate inter-plate spaces within the evaporator, which are not shown in detail because evaporator/heat exchangers are well known and commercially available. Inlet and outlet ports 64, 65 for thermal transfer fluid are similarly disposed, along the same side, but in opposite vertical positions. The two phase refrigerant from the flow control valve is fed into the evaporator 60 at the inlet 62, at the evaporation temperature of the refrigerant. The thermal interchange between the refrigerant and the thermal transfer fluid evaporates or boils off refrigerant, increasing the vapor in the two phase fluid system. The objective is to return only gas phase refrigerant so that any liquid refrigerant remains near the evaporator 60 inlet 62 without reaching the outlet 63. It is sought to achieve a balance in which the degree of evaporation is such that the output vapor temperature has at least a preset increase (or more) over the evaporation temperature, while liquid phase refrigerant does not exit the evaporator and reach the refrigeration unit 10. Under these conditions, the refrigeration unit 10 remains stable in operation, the astable operating condition is not entered, and the capability of the evaporator 60 for chilling the tool is most efficiently utilized. A heat exchanger such as the evaporator/heat exchanger 60 is a superior unit for this application, because size and thermal transfer efficiency are extremely important in some applications, as in controlling semiconductor fabrication tool temperature. In a two channel, 10 hp, system the evaporators may typically be 12 inches by 4 inches by 2 inches, although size will vary dependent on how low a temperature and which level of efficiency are to be maintained. The rate of boil off and the availability of refrigeration capacity are dependent upon the flow rate of the refrigerant, since the movement of the pressurized heat transfer fluid is substantially constant. The gas phase refrigerant continues to increase in temperature as it transports toward the outlet.

Figure 4:
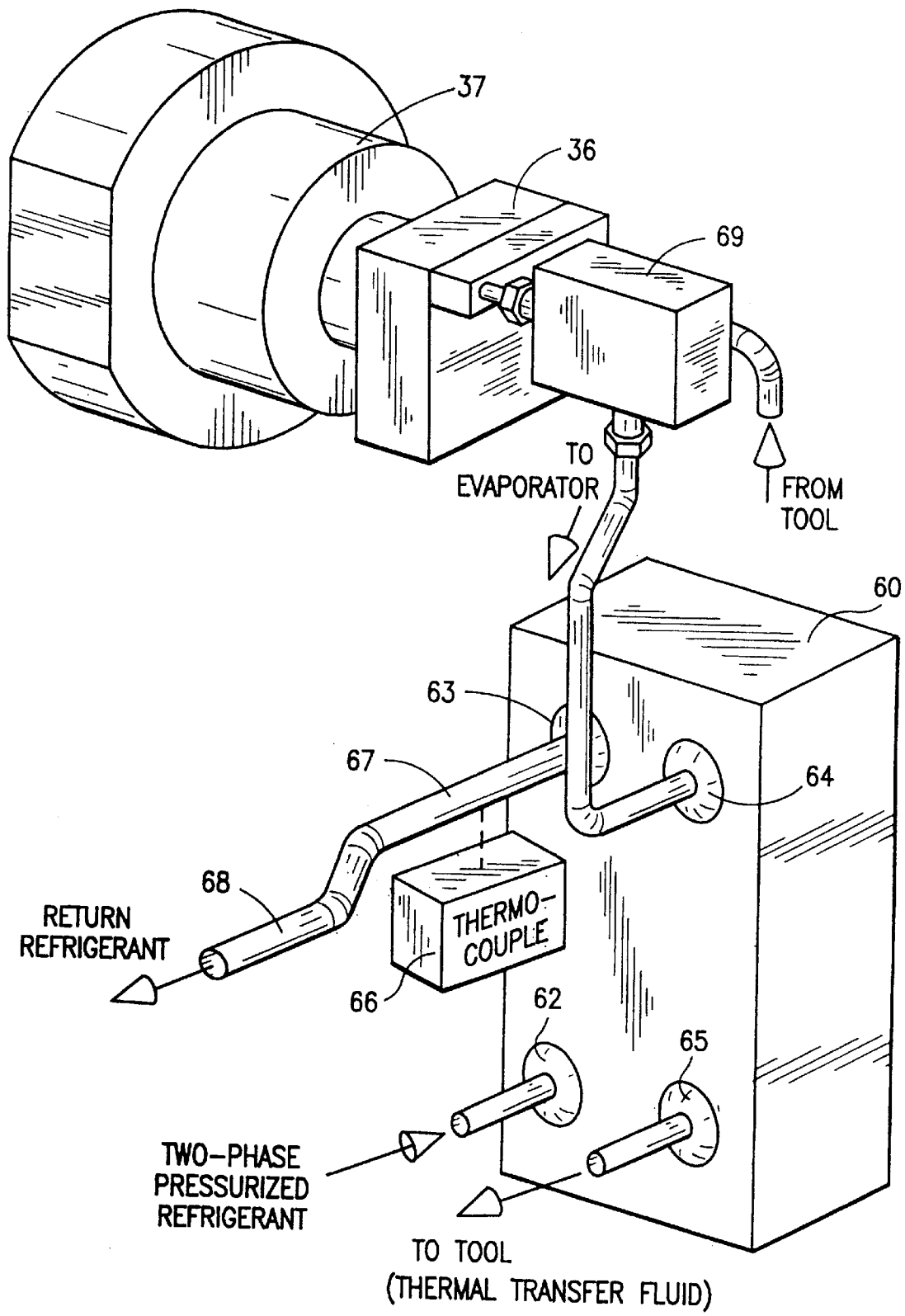
FIG. 4 is a perspective view, partially broken away, of an evaporator/heat exchanger device including a temperature sensor arrangement in accordance with the invention.

As seen in FIG. 4, to which reference is now particularly made, the refrigerant outlet 63 of the channel evaporator 60 is in thermal communication with a temperature sensor 66, such as a thermocouple, which is disposed on the underside of a heat conductive conduit 67 closely coupled to the refrigerant outlet port 63. A conduit section of low thermal conductivity, such as a stainless steel tube 68, limits the transfer of heat from external sources toward the length of conduit whose temperature is being monitored at the thermocouple 66. Similarly, referring again to FIG. 1, at the second control channel 21, the channel evaporator 70 outlet also is engaged by a temperature sensor (thermocouple) 72, likewise thermally isolated from significant external heat sources.

FIG. 4 also shows further details of the conduit and pump system for directing thermal transfer fluid returned from a tool into the evaporator 60. The flow goes into an inlet to the pump 36, the exterior of which in this view is seen as exterior insulation of rectangular outline, and the pump is rotated by an adjacent coaxial motor 37. Outlet flow passes through a flow sensor switch 69 to the input port 64 to the evaporator 60.

The first reference temperature sensor 58 coupled to the outlet from the reference evaporator 54, as seen in FIG. 1, is used to provide a temperature input signal along with the signals from the temperature sensors 66 and 72 in the two channels. By using the separate terminals of a thermocouple as the sensors 58, 66 and 72, differential comparison signals can be supplied directly to a multichannel controller 75, such as the Model CLS-200 supplied by Watlow Anafaze of Watsonville, Calif. This is a multichannel controller in which each channel is configurable for use in different modes. They may be set to monitor thresholds, compare differential temperature relationships, set limit values, and modify input signals in accordance with different other inputs. In the present instance, the multichannel controller 75 is coupled to use the differentials, below a selected threshold, between temperatures at the reference evaporator 54 outlet and at the outlets from each of the channel evaporators 60, 70 to generate a proportional driver signal. The signals in each channel of the controller 75 are coupled to control the heater 49 at the associated bulb 48 whose internal pressure controls the thermal expansion valve device 42 in the associated channel 20 or 21. The circuits to the heaters 49, however, are not closed (i.e. completed) unless safety circuits 80, 81 which are responsive to the temperature $T_{R2}$ of the reference evaporator 54 determine that the reference evaporator output has been lowered to at least 0°C. This assures that if the reference evaporator 54 is not yet adequately operational, the application of heat to the temperature control circuits in the channels 20, 21 will not damage the bulbs 48 or the heaters 49 coupled to the flow control units 42.

Figure 5:
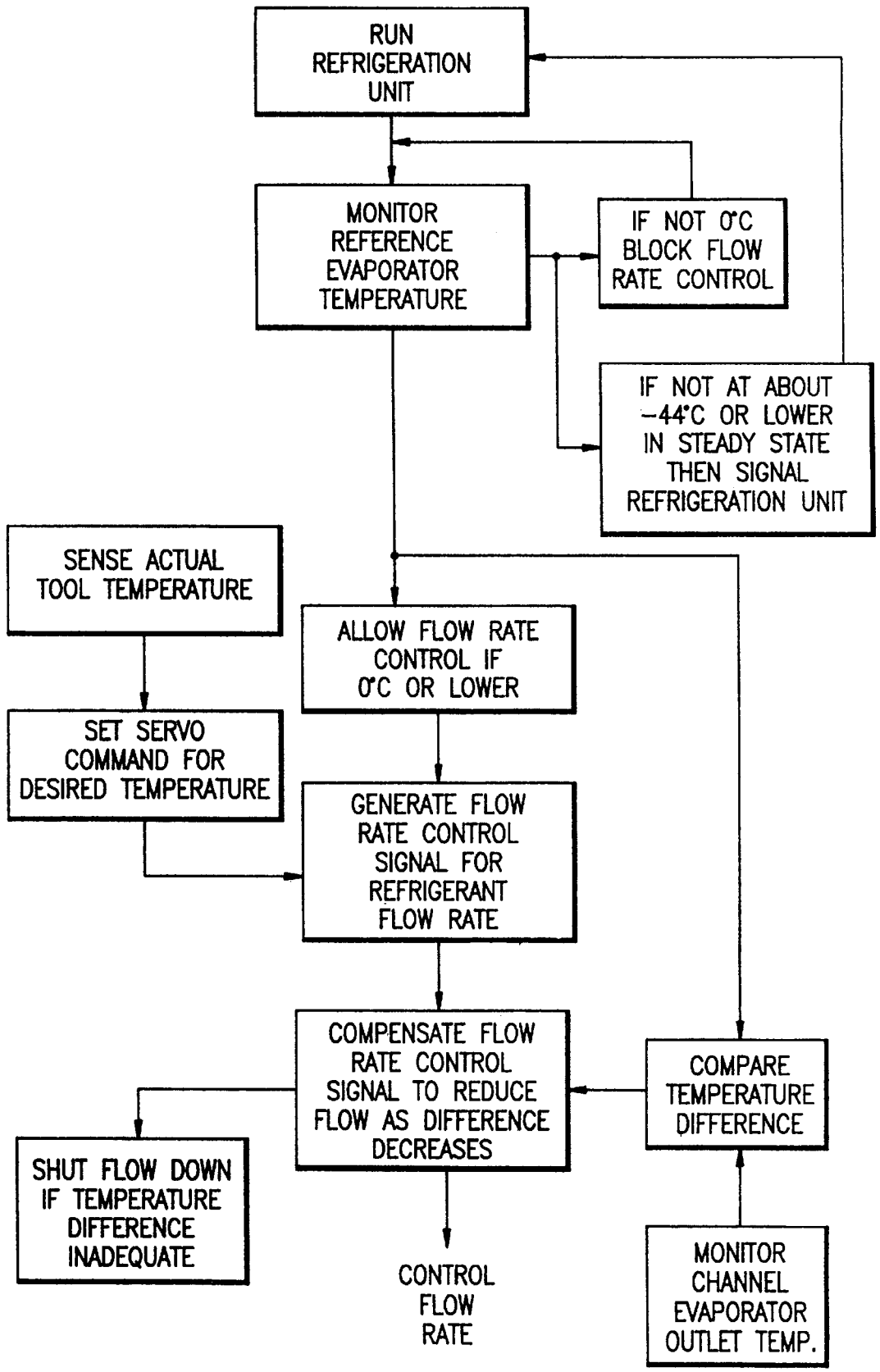
FIG. 5 is a block diagram of successive steps in an operating method in accordance with the invention.

The sequence of operation of the system of FIGS. 1–4 can be understood in conjunction with the following description, making reference to the flow sheet of FIG. 5. The drawings do not show other features of the system, such as safety and protection devices and circuits which can be used to assure that pumps are running, adequate pressure has developed, pressures are not excessive, the refrigeration unit is functioning properly and that the servo controls are normal. Such features are understood to be useful and conventional in these systems, but are not essential to the functioning of systems in accordance with the invention and therefore are not described in detail.

Referring now particularly to FIGS. 1 and 5, the single refrigeration unit 10 supplies high pressure refrigerant to two control channels 20, 21 and to the reference channel 22 which operates in conjunction with both control channels. FIG. 5 depicts how flow rate compensation in accordance with the invention works for only one of the channels, it being understood that the operations are identical even though in the short term the temperature levels that are to be maintained at the temperature control devices 30, 38 might be significantly different. When the refrigeration unit 10 of FIG. 1 has been started, as seen in the first step of FIG. 5, the sensor 58 of FIG. 1 at the output of the reference evaporator 54 indicates, by signal $T_{R1}$, the reference evaporator output temperature, which begins dropping because the small capillary 57 fully expands the refrigerant fed into the evaporator 54, which utilizes the chilling capability of the refrigerant to the utmost. However, servo signals from the multiple channel temperature control system 26 are blocked by the safety circuits 80, so that the temperature controlled devices 30, 38 cannot be driven into the desired time-temperature profile until the reference evaporator output temperature $T_R$ is at 0° C. or below. Thereafter, the resistive heaters 49 can be operated, so that the safety circuits 80 allow control signals to be applied. The servo control loop is separate but not fully exemplified in FIGS. 1 and 5, because the details of a conventional temperature control system 26 are not relevant to the control problem. However, the system 26 receives the signals $T_{DI}$ and $T_{DII}$ indicative of actual tool temperatures and generates the error or correction signals, CHI and CHII, needed to bring the temperatures to the levels set by the programs 28. The signals CHI and CHII are applied to the heaters 49 as refrigerant flow rate control signals in each channel. These signals establish the thermal balance between the sensor bulb 48 which is chilled by the reference evaporator 54 and, in opposition, heated by the heater 49, so as to selectively occlude the orifice 47 in the thermal expansion valve 42 in the same channel. Under steady state operating conditions, the thermal expansion valve 42 provides refrigerant flow in the proper proportion to the flow thermal transfer fluid that is circulated through the evaporator 60 or 70 in the associated temperature controlled device 30 or 38 respectively. That is, sufficient liquid refrigerant is boiled off in the evaporator 60 or 70 to maintain the output within a relatively few degrees, typically 10° C., of the output temperature at the reference evaporator 54. If boil off is excessive, the evaporated refrigerant rises to too high a temperature level, and the evaporator is not being efficiently used in cooling the thermal transfer fluid. The normal system response is to increase the refrigerant flow rate, which usually is adequate to make the needed correction.

Under some circumstances, however, such as a need for a very rapid temperature drop in the controlled device or tool, a very high refrigerant flow rate is called for. Adequate refrigerant flow will usually be available, considering the demand in the other channel (or channels) of the system. Here, as seen in the next step of FIG. 5, the monitoring system comes into play, by sensing the difference between the reference evaporator 54 output temperature ($T_{R1}$) and the separate channel evaporator output temperatures $T_{EI}$ and $T_{EII}$ in the flow rate compensation circuit 75. Whenever the expanded refrigerant temperature has lowered the channel evaporator to, or close to, the temperature of evaporation, as established by the reference evaporator 54 output temperature, there is a danger of overtaxing the channel and entering the astable condition. Some allowance has to be made for post-heating of the gas phase, since the thermal transfer fluid, as well as ambient and other thermal sources, will contribute heat before the location of the temperature sensor is reached. This depends on the design of the evaporator and how the insulation is used. Consequently, a small range is established, above which normal servo commands make the correction and below the upper limit of which the danger of returning liquid refrigerant to the refrigeration unit 10 increases. Accordingly as the temperature differential decreases below the selected level (here 10° C.) the compensation circuits 75 begin to reduce the amplitude of the voltage then applied to the heater 49 in that respective channel, whatever that voltage may be. Accordingly, there is relative adjustment or compensation of the servo error signal, which necessarily counteracts to a degree the speed of correction of the temperature of the controlled device 30 or 38. The reduction of the size of the refrigerant flow orifice is proportional to the compensation statement, which ultimately turns off the thermal expansion valve 44 in the affected/channel entirely when the temperature differential is at a chosen minimum (e.g. −2° C.).

Although such conditions arise most often in the sharper excursions of the temperature-time profile for a controlled device, they can also arise in one or both channels when there is some interdependent action between the channels.

Accordingly, the system, with the compensation circuits 75 incorporated in this manner, assures that return of liquid refrigerant from one or more channels the refrigeration unit 10 will not occur, preventing entry into the astable condition and possible resultant damage to the refrigeration unit. In the operation of the controlled device itself, such as a semiconductor tool which may be changed in mode from heated to a chilled status, the consequence of the use of compensation is merely a delay in the initiation of the next phase of the tool cycle.

The setting of the temperature differential between the channel evaporator 60 or 70 and the reference evaporator 54 is selected in accordance with the extent to which external heating effects are likely to be encountered in different parts of the system. Some of these effects are minimized, in accordance with the invention, by positioning and thermally isolating the sensor thermocouple 66 (see FIG. 3) that is disposed at the refrigerant output of the evaporator 60 by putting the thermocouple 66 in close association with the underside of the output conduit 67, a short length of which in this region is thermally conductive. The thermocouple 66 is thus more sensitive to the presence of any refrigerant present in the liquid phase in the output. Heating from ambient environmental temperature and from uncooled conduits will then have minimal effect on the temperature reading. The conduit 67 is coupled at its opposite end to a substantial length of conduit 68 of relatively low heat conductive material such as stainless steel tubing, for limiting heat conduction from external sources into the region of the thermocouple 66.

Another safety factor employed in the system derives from the use of the temperature of the reference evaporator 54 as an indication of overtaxing the system. The refrigeration unit 10 provides the needed output pressure and temperature, but if return refrigerant is too high in temperature the compressor pressure must build up to respond, leading to a danger of compressor failure. The pressure increase is reflected in reference evaporator temperature level. When it rises above −44° C., the refrigeration unit 10 will be signaled and, if necessary, the signals to the heaters will be shut off.

At the reference evaporator 54, and the subcooler 16, referring again to FIG. 1, the configuration efficiently limits undesired heat transfer. The reference evaporator 54 is closely coupled to the return line leading in to the subcooler 16, and return lines (not fully shown) from the control channels 20, 21 are joined at a T junction. The output gas refrigerant from the reference evaporator 54 is fed into the subcooler 16, and the capillary 57 feeding into the input to the reference evaporator 54 is relatively short, and none of these lines need be insulated.

Figure 6:
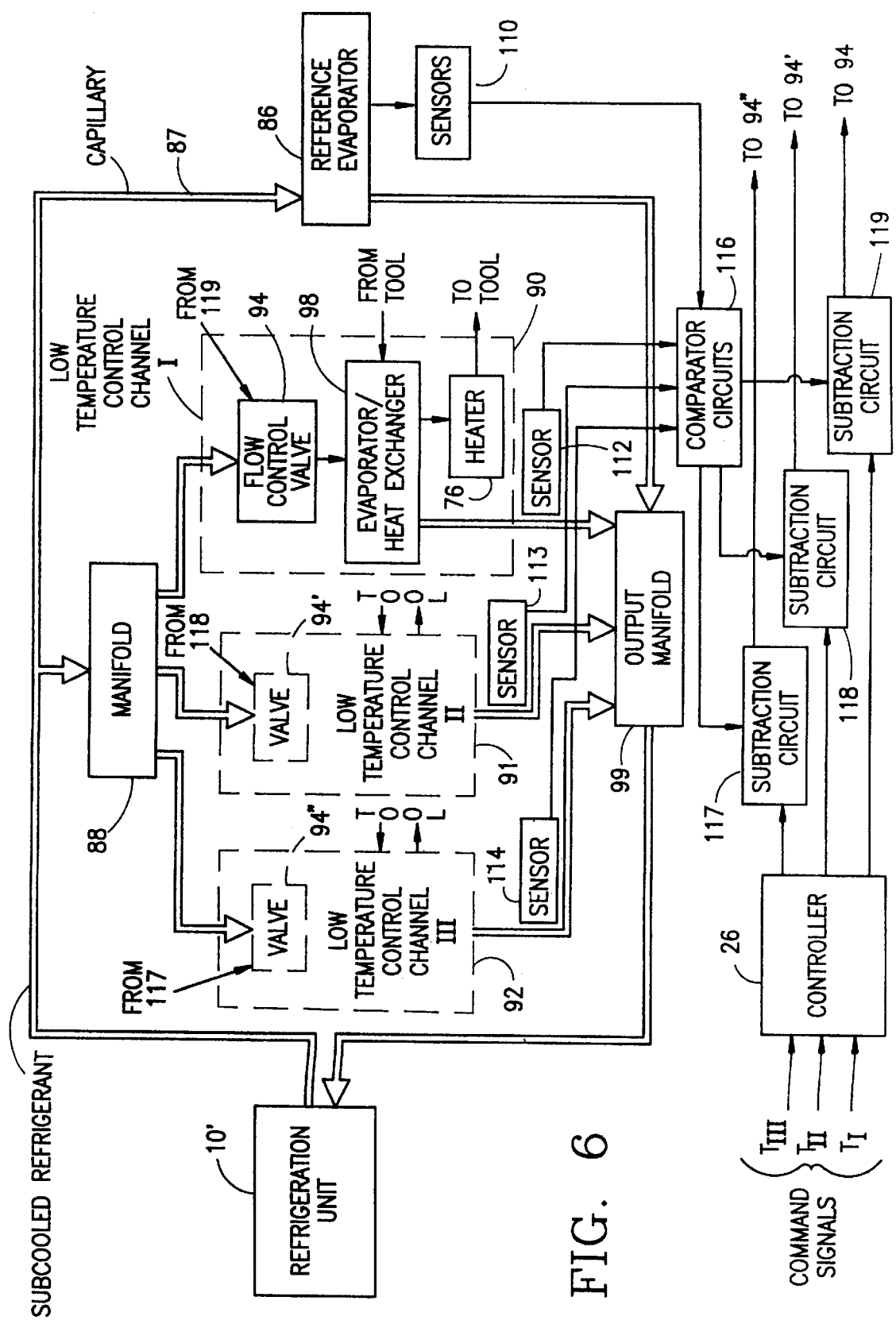
FIG. 6 is a block diagram of a second example of a system in accordance with the invention.

In the alternative arrangement of a system for avoiding the occurrence of the astable condition in a proportional control valve system, as shown in FIG. 6, there are three temperature control channels instead of two, individual compensation circuits instead of a multichannel controller, and flow controls operated directly by electrical signals.

In this arrangement, a reference evaporator 86 fed by a capillary 87 with subcooled refrigerant is used in parallel 9 (or serially) with a manifold 88 feeding the three branches constituting temperature control channels 90, 91, 92 for separate tools (not shown) and flow control valves 94, 94' and 94". The flow control valves 94 are proportioned devices having electromagnetic or other actuators that are directly signal responsive to control the refrigerant flow through variable size orifices. The different evaporator/heat exchanger units 98 (only one is shown) in the channels 90, 91, 92 each control the degree of chilling of the heat transfer fluid moving through the interior evaporator/heat exchanger units from and to the associated tool (not shown). Thereafter, the outputs of the evaporator/heat exchangers 98 are combined in an output manifold 99, and returned to the refrigeration unit 10'. Control of the flows of subcooled refrigerant through the flow control valves 94 is regulated electronically by separate circuits, using the relationship between the temperature at the outlets of the individual evaporator/heat exchangers 98 and the reference evaporator 86. A reference thermocouple or other temperature sensor 110 is positioned to be responsive to the temperature level at the reference evaporator 86 outlet, and another sensor may be included to measure the absolute temperature level, as previously described, so as to avoid overtaxing the compressor in the refrigeration unit 10. Separate temperature sensors 112, 113 and 114 provide individual indications of the different temperature levels at the outputs of the evaporator/heat exchangers in the different control channels 90, 91, 92. Each of the sensed temperature signals from the individual channel sensors 112, 113 and 114 are compared, in comparator circuits 116, to the reference evaporator 86 output temperature level as measured by a reference sensor 110. Thus, three difference or delta temperature values are provided to individual subtraction circuits 117, 118 and 119.

These subtraction circuits 117, 118 and 119 are also individually in circuit with the temperature command signals $T_I$, $T_{II}$, and $T_{III}$ from the servo system or controller (as in FIG. 1) which provides the error correction signals for adjusting the different tool temperatures. The subtraction circuits 117, 118 and 119, in turn supply compensated control signals to the flow control valves 94, 94' and 94". The comparator circuits 116 respond to the difference ($\Delta_T$) between the channel evaporator/heat exchanger temperature in each channel and the reference evaporator outlet temperature. As long as that difference $\Delta_T$ is greater than a chosen value such as 10° C., no correction is made in the command signals, but if the $\Delta_T$ value is at the chosen value, then the subtraction circuits 117, 118 or 119 reduce the associated command temperature by 1° C. The subtraction value is increased for each 1° C. difference in $\Delta_T$, changing in a linear manner until the flow control valve is shut off at a $\Delta_T$ difference of 0° C. Consequently, the channel evaporators cannot reach the astable condition of operation in which liquid refrigerant is returned to flood the compressor in the refrigeration unit 10'.

Although a number of alternatives and modifications have been shown or described, the invention is not limited thereto but encompasses all forms and variations in accordance with the appended claims.

We claim:

1. A system for receiving a pressurized liquid refrigerant from a refrigeration unit and providing a low temperature reference that varies only with refrigeration capacity of the refrigerant, comprising:

a subcooler coupled to the refrigeration unit and passing outgoing pressurized refrigerant to an outlet in heat exchange relation to returned gas phase refrigerant received at an inlet;

a cylindrical evaporator defining an interior volume and a thermally conductive outer wall bounding the volume, the interior volume of the evaporator being in communication with the subcooler return inlet; and a capillary tube coupling the subcooler pressurized refrigerant outlet to the interior of the evaporator and sized such that the refrigerant within the volume is wholly in gas phase and chills the boundary wall to a minimum temperature level.

2. A system as set forth in claim 1 above, wherein the cylindrical evaporator includes a central core and a finned heat exchanger between the central core and the conductive outer wall.

3. A system as set forth in claim 2 above, also including a temperature controlled device for providing a position controlling physical output comprising a substantially closed chamber in thermal contact with the boundary wall of the evaporator and including a pressurized gas whose pressure varies with evaporator temperature and which includes an outlet conduit available to couple to an external device, and a thermal insulating element between the evaporator wall and the chamber and selected in thickness and insulation properties to time average temperature fluctuations in the evaporator.

* * * * *